(12) United States Patent
Chen et al.

(10) Patent No.: US 9,456,448 B2
(45) Date of Patent: Sep. 27, 2016

(54) METHOD OF PATTERN-BASED MESSAGE TRANSMISSION

(71) Applicant: Alcatel Lucent, Boulogne Billancourt (FR)

(72) Inventors: Yu Chen, Shanghai (CN); Jialin Zou, Randolph, NJ (US); Sudeep Palat, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/346,038

(22) PCT Filed: Sep. 19, 2012

(86) PCT No.: PCT/IB2012/002168
§ 371 (c)(1),
(2) Date: Mar. 20, 2014

(87) PCT Pub. No.: WO2013/046022
PCT Pub. Date: Apr. 4, 2013

(65) Prior Publication Data
US 2014/0302811 A1    Oct. 9, 2014

(30) Foreign Application Priority Data

Sep. 30, 2011   (CN) .......................... 2011 1 0296341

(51) Int. Cl.
*H04W 72/04*    (2009.01)
*H04W 24/10*    (2009.01)
(Continued)

(52) U.S. Cl.
CPC ........... *H04W 72/048* (2013.01); *H04W 24/10* (2013.01); *H04W 4/005* (2013.01); *H04W 72/02* (2013.01); *H04W 72/0406* (2013.01)

(58) Field of Classification Search
CPC .......................... H04W 72/048; H04W 24/10
USPC ........ 455/405, 450, 424, 425, 428; 370/328, 370/329
See application file for complete search history.

(56) References Cited

U.S. PATENT DOCUMENTS

2010/0144360 A1*  6/2010  Okuda .......................... 455/450
2010/0188990 A1   7/2010  Raleigh
(Continued)

FOREIGN PATENT DOCUMENTS

CN    101931989 A    12/2010
CN    102036310 A    4/2011
(Continued)

OTHER PUBLICATIONS

"3rd Generation Partnership Project; Technical Specification Group Services and System Aspects; System Improvements for Machine-Type Communications; (Release 11)," 3GPP TR 23.888, V1.3.0, 6 pages, (Jun. 2011).
(Continued)

*Primary Examiner* — Cong Tran
(74) *Attorney, Agent, or Firm* — Fay Sharpe, LLP

(57) ABSTRACT

The invention provides a method of pattern-based message transmission. The method can predetermine a transmission pattern for the message transmission between a base station and a user equipment according to a service type, an equipment identifier, and etc., of the equipment and can hereby determine a transmission process of signaling and data and thus can handle the remaining transmission of either signaling or data to be performed in the predetermined pattern, which means that scheduling resources can be greatly saved and thus signaling overheads and the resource consumption can be greatly reduced. With an optimized design of a pattern, an acknowledgement message and subsequent signalings and/or data could be encapsulated in a same data packet for transmission and reception, thereby resources are further saved. This improves the efficiency of utilizing signaling greatly in general, reduces signaling overheads, and also facilitates various communication between other users in the cell, improves the efficiency of economy and saves cost.

15 Claims, 4 Drawing Sheets

(51) Int. Cl.
    *H04W 4/00*     (2009.01)
    *H04W 72/02*    (2009.01)

(56) References Cited

U.S. PATENT DOCUMENTS

2010/0238872 A1* 9/2010 Kim et al. ............... 370/329
2012/0295580 A1* 11/2012 Corner ................. H04W 12/12
                                                    455/405

FOREIGN PATENT DOCUMENTS

| CN | 102158963 A | 8/2011 |
| JP | 2008-5233 A | 1/2008 |
| JP | 2013-506387 A | 2/2013 |
| KR | 10-2004-0077806 | 9/2004 |
| WO | WO 2011/041459 A1 | 4/2011 |
| WO | 2011/053219 A1 | 5/2011 |
| WO | 2011/060707 A1 | 5/2011 |
| WO | 2011/065407 A1 | 6/2011 |

OTHER PUBLICATIONS

"3rd Generation Partnership Project; Technical Specification Group Services and System Aspects; Service requirements for Machine-Type Communication (MTC); Stage 1 (Release 11)," 3GPP TS 22.368, V11.2.0, pp. 1-25, XP050553322, (Jun. 2011).

"3rd Generation Partnership Project; Technical Specification Group Services and System Aspects; System Improvements for Machine-Type Communications; (Release 11)," 3GPP TR 23.888, V1.4.0, pp. 1-139, XP050553713, (Aug. 2011).

China Unicorn, "Time Control according to MTC device Identifiers," 3rd Generation Partnership Project (3GPP), 3GPP TSG SA WG2 Meeting #79, S2-102330, pp. 1-3, XP050434510, Kyoto, Japan, May 10-14, 2010.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (3GPP TS 36.300 version 10.4.0 Release 10)," 3GPP TS 36.300, V10.4.0, pp. 1-207, XP050553479, (Jun. 2011).

International Search Report for PCT/IB2012/002168 dated Mar. 8, 2013.

\* cited by examiner

METHOD OF PATTERN-BASED MESSAGE TRANSMISSION

FIELD OF THE INVENTION

The present invention relates to a method of message transmission, and particularly to a method of pattern-based message transmission.

BACKGROUND OF THE INVENTION

Machine Type Communication is a project newly introduced in a Long Term Evolution (LTE) system. The LTE is an OFDM-based system where a signaling connection setup, allocation of resources and communication over the prescribed resource is required for communication. In the LTE system, there is a specific match relationship between signaling and data, and interaction of a lot of signaling is required for the data transmission. Unlike human to human communication, e.g., lingual communication, an is Internet access and etc., the data amount of the messages required to be transmitted in MTC is low, for example, a machine simply reports a parameter (e.g., temperature, a reading of an electric meter, etc.).

For human to human communication, there is a lot of data amount to be transmitted, the proportion of signaling is low. However, for MTC, the data amount to be transmitted is low, so the proportion of signaling is low, thus resulting in signaling overload and economy problems. For example, a high proportion of signaling has to be consumed even if a message with a low data amount is transmitted.

The following situation will arise due to this problem. For example, for the data transmission between User Equipments (UEs) in MTC, the system can support data transmission of a user but can not bear signaling, that is, the system can support only a small number of users at the signaling aspect. The problem of a signaling overload as a result thereof will also influence communication efficiency.

On the other hand, both data transmission and signaling transmission will be scheduled via Physical Downlink Control Channel (PDCCH) signaling. However, PDCCH resources are limited and shared throughout a cell. Signaling resulting from MTC has a higher priority than data during scheduling. Thus, an excessive resource may be occupied and even all the PDCCH resources may be consumed by considerable signaling overheads resulting from MTC, which causes a serious consequence, for example, influencing communication of other users in the cell, restricting communication of the another user (for example, a user in an ongoing voice communication may be dropped).

SUMMARY OF THE INVENTION

Apparently, the drawback of the prior art is that considerable signaling overheads for MTC have to be consumed for the transmission of a low amount of data, while it will also influence the total resource in a cell, for is example, the allocation of PDCCH resources. The excessive signaling overheads may restrict the communication of another user in the cell, so how to reduce the signaling overheads is a challenging issue.

Since many User Equipments (UEs) of MTC in a cell run a certain application or service, the cell has a large number of users but the application is unique, and the UEs of MTC typically perform similar operations in the progress of network access, security authentication, data uploading and link releasing each time they access a network, so communication resulting therefrom is based on a same flow. Thus, a pattern can be predetermined for the transmission of these messages.

On the basis thereof and in order to address the foregoing problem in the prior art, the invention provides a method of performing pattern-based message transmission in a user equipment served by a base station, the method including the steps of: A. transmitting an equipment identifier of the user equipment to the base station; B. receiving pattern information from the base station, the pattern information being determined by the base station; and C. performing message transmission with the base station based on the pattern information.

According to an embodiment of the invention, the pattern information includes at least one parameter associated with the message transmission, and the parameter includes at least one of a message delay and a message size.

The invention further provides a method of performing pattern-based message transmission in a base station serving a user equipment, the method including the steps of: A. receiving an equipment identifier of the user equipment from the user equipment; B. determining pattern information for the user equipment according to the equipment identifier; C. transmitting the pattern information to the user equipment; and D. performing message transmission with the user equipment based on the pattern information.

According to an embodiment of the invention, the step B further is includes: the base station pre-stores the equipment identifier and the pattern information corresponding to the equipment identifier, and determines the pattern information for the user equipment according to the equipment identifier.

According to an embodiment of the invention, the pattern information includes at least one parameter associated with the message transmission, and the parameter includes at least one of a message delay and a message size.

The invention further provides a method of performing pattern-based message transmission in a user equipment served by a base station, the method including the steps of: A. receiving system information from the base station via a broadcast of the base station, the system information including equipment identifiers of respective user equipments and corresponding pattern information; and B. selecting the corresponding pattern information from the system information according to the equipment identifier to perform message transmission with the base station based on the pattern information.

According to an embodiment of the invention, the system information further includes service identifiers, and the step B further comprises: selecting the corresponding pattern information from the system information according to the equipment identifier and the service identifier to perform message transmission with the base station based on the pattern information.

According to an embodiment of the invention, the pattern information includes at least one parameter associated with the message transmission, and the parameter includes at least one of a message delay and a message size.

The invention further provides a method of performing pattern-based message transmission in a base station serving a user equipment, the method including the steps of: A. broadcasting system information to respective user equipments, the system information including equipment is identifiers of the respective user equipments and corresponding pattern information; and B. performing message transmission with the user equipment based on the pattern information selected by the user equipment.

According to an embodiment of the invention, the system information further includes service identifiers so that the user equipment selects the corresponding pattern information from the system information according to the equipment identifier and the service identifier to perform message transmission with the base station based on the pattern information.

According to an embodiment of the invention, the pattern information includes at least one parameter associated with the message transmission, and the parameter includes at least one of a message delay and a message size.

The invention further provides a method of performing pattern-based message transmission in a user equipment served by a base station, the method including the steps of: A. transmitting pattern information to the base station; B. receiving from the base station the pattern information confirmed and/or altered by the base station; and C. performing message transmission with the base station based on the pattern information confirmed and/or altered by the base station.

According to an embodiment of the invention, the pattern information includes at least one parameter associated with the message transmission, and the parameter includes at least one of a message delay and a message size.

The invention further provides a method of performing pattern-based message transmission in a base station serving a user equipment, the method including the steps of: A. receiving pattern information from the user equipment; B. confirming and/or altering the pattern information according to a practical condition; C. transmitting the confirmed and/or altered pattern information to the user equipment; and D. performing message transmission with the user equipment based on the confirmed is and/or altered pattern information.

According to an embodiment of the invention, the pattern information includes at least one parameter associated with the message transmission, and the parameter includes at least one of a message delay and a message size; and/or the practical condition includes at least one of current allocation of physical resources, a real protocol flow and a process delay.

With a preferred embodiment of the invention, a base station (eNB) predefines transmission patterns for similar or identical services operated by respective UEs of MTC or pre-negotiates with the respective UEs of MTC about the transmission patterns, and these transmission patterns are based on identifiers, applications or services of the UEs of MTC. The base station can determine a transmission procedure of signaling and data, when the base station defines or acquires the pattern of the message transmission to be performed by a UE of MTC, i.e., pattern information. In this way, the remaining transmission (either signaling or data transmission) to be performed can be handled in a predetermined pattern, which means that scheduling resource can be greatly saved and thus signaling overheads can be greatly reduced.

Also with another preferred embodiment of the invention, with an optimized design of a pattern, an acknowledgement message and subsequent signalings and/or data could be encapsulated in a same data packet for transmission and reception, thereby resources are further saved. This improves the efficiency of utilizing signaling greatly in general, reduces signaling overheads, and also facilitates various communication between other users in the cell, improves the efficiency of economy and saves cost.

Various aspects of the invention will become more apparent from the following description of embodiments.

BRIEF DESCRIPTION OF DRAWINGS

With reference to the following detailed description of the is non-restrictive embodiments, other features, objects and advantages of the present invention will be more apparent.

Identical or similar reference numerals refer to identical or similar components or features throughout the drawings.

DETAILED DESCRIPTION OF EMBODIMENTS

Figure 1:
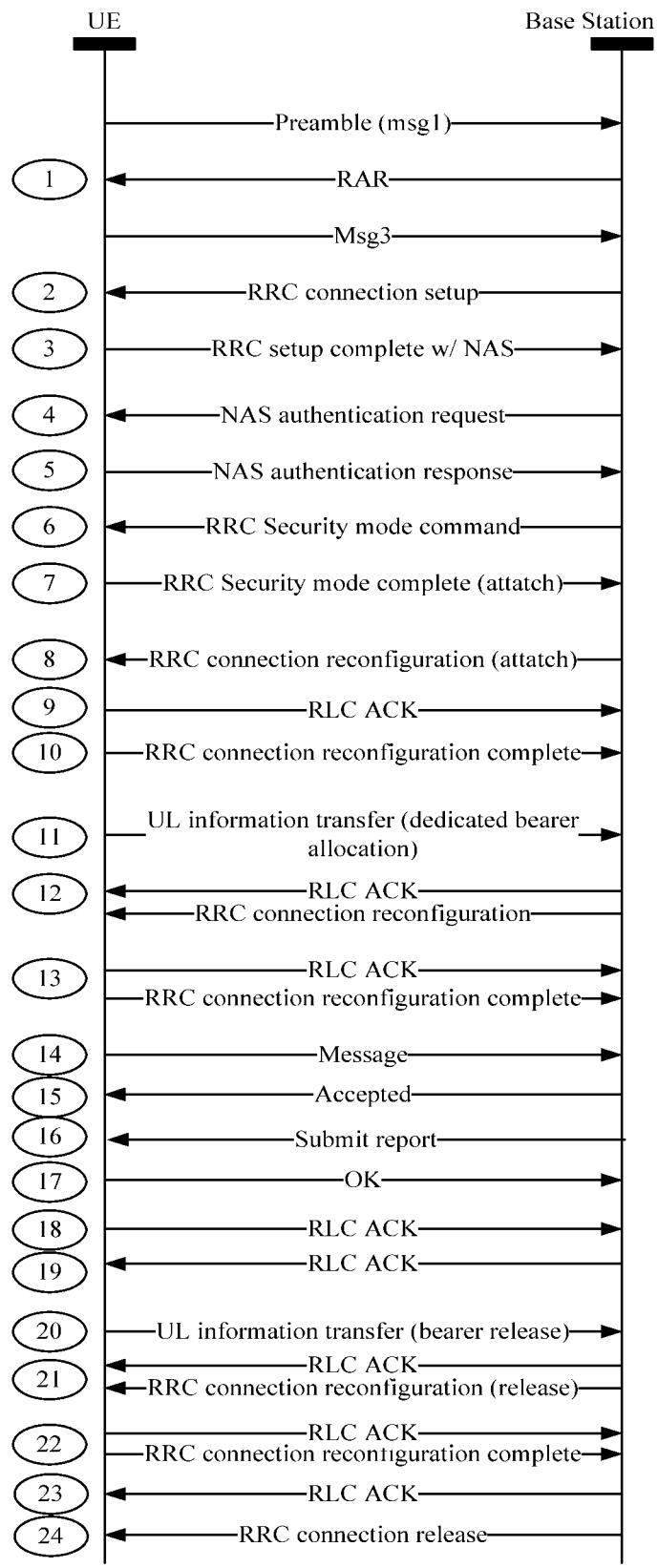
FIG. 1 illustrates a schematic diagram of a UE of MTC performing message transmission with a base station in the prior art.

FIG. 1 illustrates a schematic diagram of a UE of MTC performing message transmission with a base station in the prior art. As illustrated, the process is a process starting from UE accessing a network until UE releasing a connection through Radio Resource Control (RRC). Since a base station does not know the specific conditions of the transmission interval, content and etc. of each message, the resources of a system have to be scheduled each time when signaling or data is transmitted. As illustrated, there are 24 messages in total by which PDCCH signaling resources are consumed, and this means an additional 24 times load is required for the transmission of a data packet. More signaling interaction steps may be further required if the UE of MTC further activates, for example, security and other functions. Also more signaling interaction will be required for delayed transmission or retransmission. Thus, in practice, more PDCCH signaling resources tend to be consumed. This will is further increase signaling overheads and thus result in numerous serious problems.

However, UEs of MTC usually perform identical and/or similar applications and/or services and the communication flows they experienced are always identical as described above. Thus, a transmission pattern can be defined for identical and/or similar services of different UEs and/or the same UE, for example, for a typical application, e.g., in which a water meter reports a reading (that is, a corresponding transmission pattern can be defined for a UE with a single service according to an equipment identifier and a corresponding transmission pattern can be defined for a UE with a plurality of services according to the equipment identifier and a current service identifier thereof); and the pattern information of the service can be determined to predefine the exchange of messages (data and signaling) to be performed. For example, the pattern information includes at least one parameter associated with the message transmission. For example, the parameter includes, but not limited to, the size of each exchanged message, the delay between the respective messages, etc. In the schematic diagram of the message transmission illustrated in FIG. 1, for example, the pattern information can include the size of a message in the figure and the delay between messages. In this way, the base station can acquire the flow and content of the whole communication in advance (for example, acquire when to transmit each message, the content of each message and etc.). Thus, it is not necessary to schedule each message, but it only needs to schedule the first message of the communication started in a pattern after the pattern is determined. Apparently, signaling overheads and thus resources can be greatly saved due to the pattern-based message transmission of the invention.

Figure 2:
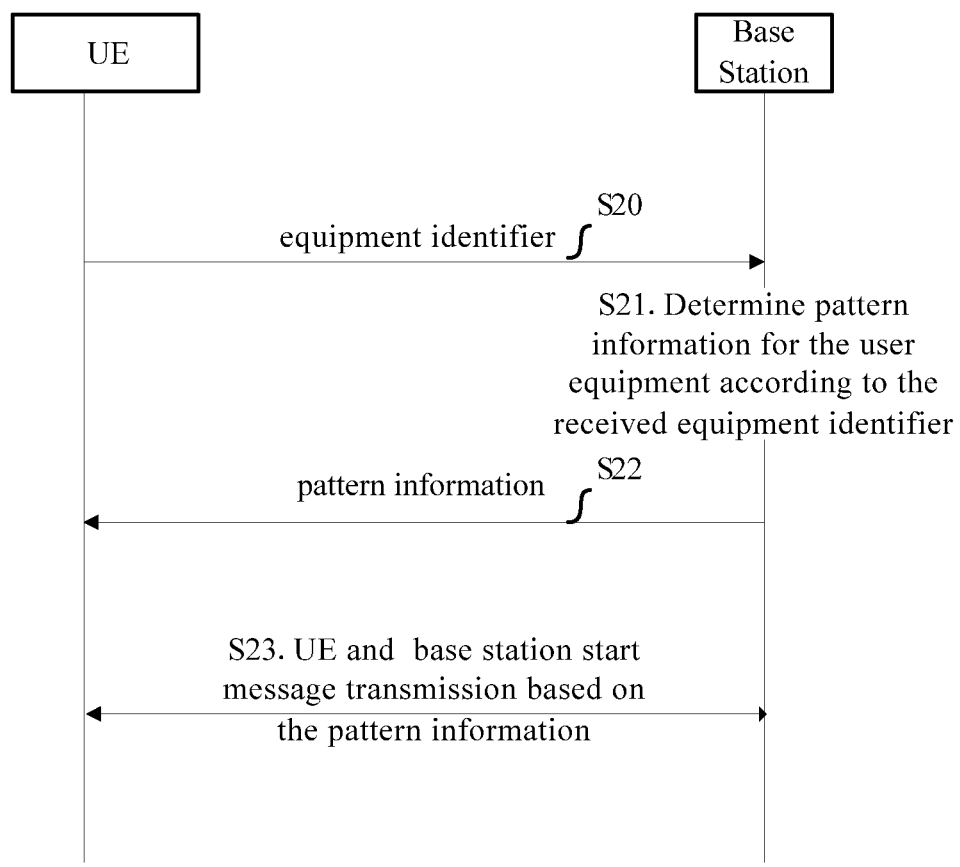
FIG. 2 illustrates a schematic diagram of a systematic method of a method of pattern-based message transmission according to an embodiment of the invention.

FIG. 2 illustrates a schematic diagram of a systematic method of a method of pattern-based message transmission according to an embodiment of the invention. In the step S20, a UE transmits an is equipment identifier to a base station. For example, this transmission step can be performed by transmitting an International Mobile Subscriber Identification Number (IMS) to the base station in an Msg3 RRC Connection Request in FIG. 1. And in this step, the base station receives the equipment identifier of the UE from the UE.

In the step S21, the base station determines pattern information for the UE according to a type to which the UE belongs based on the received equipment identifier. In a preferred embodiment, the base station pre-stores the equipment identifiers and the pattern information corresponding to the equipment identifiers and can hereby determine the pattern information for the user equipment according to the equipment identifier. And the pattern information includes, for examples, the size of each exchanged message, the delay between respective messages and etc.

In the step S22, the base station transmits the determined pattern information to the UE. For example, the base station can transmit the determined pattern information to the UE during the setup of an RRC connection. And in this step, the UE receives the pattern information from the base station. In a preferred embodiment, the base station can transmits the pattern information to the UE as a part of Quality of Service (QoS).

In the step S23, the UE and the base station start message transmission based on the pattern information, for example, the message transmission numbered from 3 to 24 in FIG. 1. Since the base station acquires specific steps of the message transmission to be performed in advance, for example, the transmission time, the transmission content, the time interval and etc., it is only necessary to schedule them once instead of scheduling all the remaining transmission of each message, thereby greatly saving signaling resources.

Figure 3:
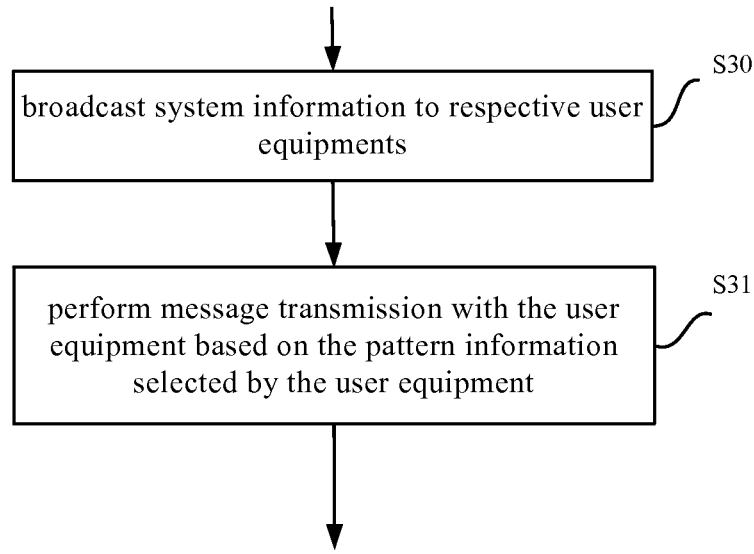
FIG. 3 and FIG. 4 illustrate method flow charts at a base station and at a user equipment for a method of pattern-based message transmission according to another embodiment of the invention.
Figure 4:
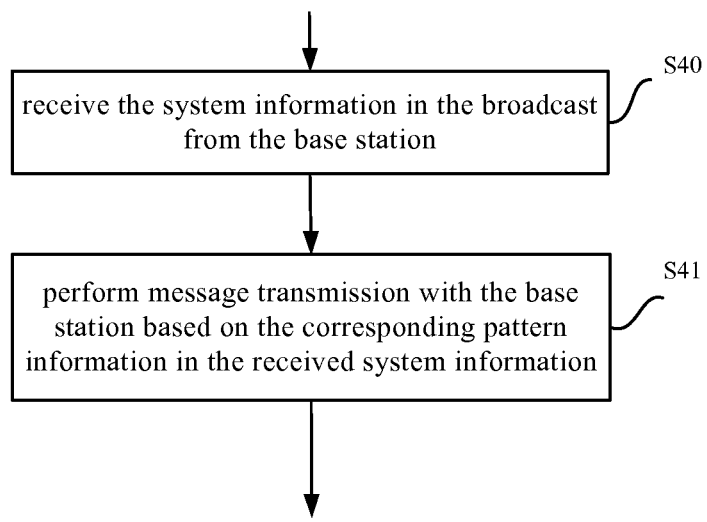

FIG. 3 and FIG. 4 illustrate method flow charts at a user equipment and at a base station for a method of pattern-based message transmission according to another embodiment of the invention. In the step S30, a base station broadcasts system information to respective user equipments, the is system information including equipment identifiers of the respective user equipments and the corresponding pattern information. In the step S40, the respective user equipments receive the system information from the base station via the broadcast of the base station.

In the step S41, the user equipment selects the corresponding pattern information from the system information according to the equipment identifier in order to perform message transmission with the base station based on the pattern information. In the step S31, the base station performs message transmission with the user equipment based on the pattern information selected by the user equipment. For example, the user equipment can transmit the selected pattern information to the base station in an RRC Connection Request to hereby perform pattern-based communication with the base station.

For example, the pattern information includes at least one parameter associated with message transmission, for example, including but not limited to the size of each exchanged message, the delay between respective messages, and etc.

In a preferred embodiment, the system information can further include service identifiers. The service identifiers correspond to a variety of services that can be performed by the corresponding user equipments. If a user equipment has a variety of services, then it can select the corresponding pattern information from the system information according to the equipment identifier and the service identifier in the system information in order to perform message transmission with the base station based on the pattern information.

Figure 5:
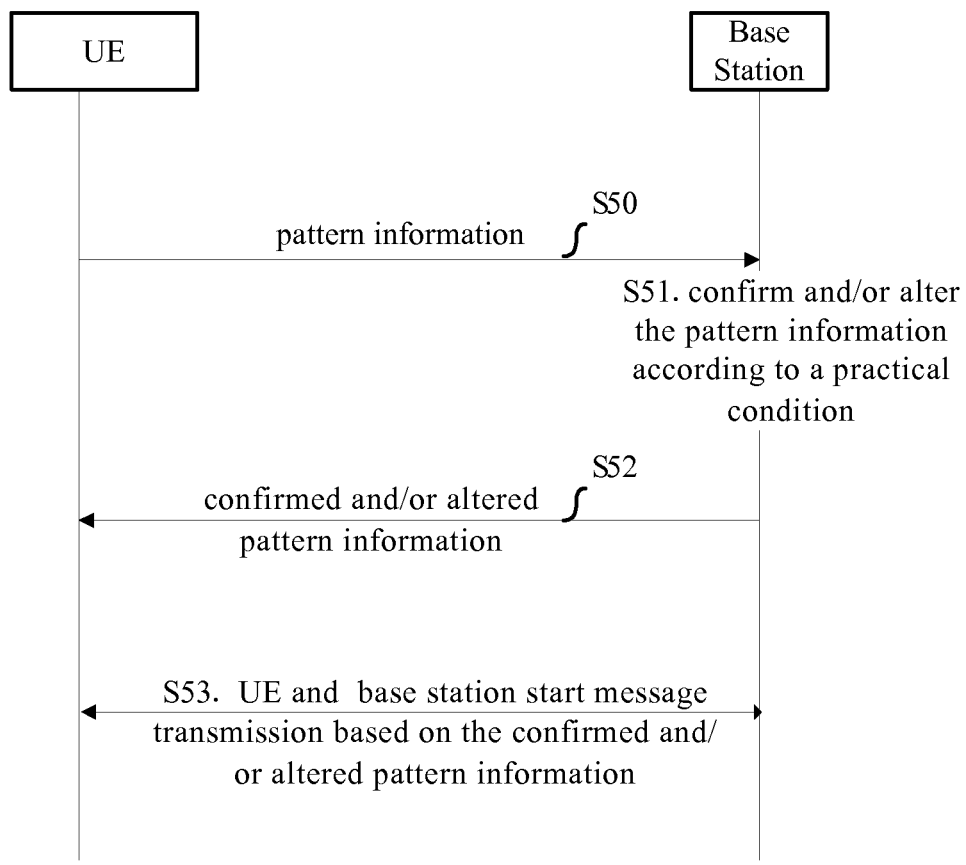
FIG. 5 illustrates a schematic diagram of a systematic method of a method of pattern-based message transmission according to a further embodiment of the invention.

FIG. 5 illustrates a schematic diagram of a systematic method of a method of pattern-based message transmission according to a further embodiment of the invention. In the step S50, a user equipment transmits pattern information to a base station, for example, transmits the pattern information to the base station in an RRC Connect Request, and the base station receives the pattern information from the user equipment. The is pattern information is defined by the user equipment according to its service(s) and the specific content and the size of a message and can include but will not be limited to the size of each exchanged message, the delay between respective messages, and etc.

In the step S51, the base station confirms and/or alters the received pattern information according to a practical condition. The practical condition can include at least one of current allocation of physical resources, a real protocol flow and a process delay.

In the step S52, the base station transmits the confirmed and/or altered pattern information to the user equipment, and the user equipment receives the pattern information confirmed and/or altered by the base station from the base station.

In the step S53, the base station and the user equipment perform message transmission based on the pattern information confirmed and/or altered by the base station.

In another preferred embodiment of the invention, the user equipment and the base station can acquire the pattern information from a shared database in advance and perform message transmission based on the pattern information. Alternatively, the user equipment and the base station can determine the pattern information in a predefined protocol in order to perform message transmission based on the pattern information.

In a further preferred embodiment of the invention, the user equipment can negotiate with the base station about the pattern information when it performs data transmission with the base station at the first time and use the pattern information directly and perform data transmission with the base station when it subsequently performs data transmission with the base station.

In the foregoing embodiments, the size of a message can be preset according to the specific content transmitted in the message, and the delay of each message can be set appropriately for a practical application. The retransmission, the time period for processing each message at a is background and other factors could also be taken into account. Furthermore, with an optimized design of a pattern, an acknowledgement message and subsequent signalings and/or data could be encapsulated in a same data packet for transmission and reception, thereby resources are further saved. This improves the efficiency of utilizing signaling greatly in general, reduces signaling overheads, and also facilitates various communication between other users in the cell, improves the efficiency of economy and saves cost.

Additionally, when there is a message transmitted unsuccessfully, then the base station can make a Hybrid Automatic Repeat Request (HARQ) based on a Cell Radio Network Temporary Identifier of the user equipment of MTC without any influence on the performance of the whole flow, because the delay in the transmission of each message can be set appropriately to be compatible with a delay caused by a potential HARQ retransmission.

It should be noted the foregoing embodiments are merely exemplary but not intended to limit the invention. Any technical solutions without departing from the spirit of the invention fall into the scope of the invention and this includes the usage of different technical features appearing in different embodiments and potential combinations of various features and embodiments for achieving benefits. Furthermore, any reference numerals in the claims should not be construed as limiting the related claims, and the term "include/comprise" shall not preclude other elements or steps unlisted in the claims or the description.

The invention claimed is:

1. A method of performing pattern-based message transmission in a user equipment served by a base station, the method comprising:
   transmitting an equipment identifier of the user equipment to the base station;
   receiving pattern information from the base station, the pattern information being determined by the base station; and
   performing message transmission with the base station based on the pattern information;
   wherein, the pattern information predefines an exchange of messages to be performed, thus the flow and content of the whole communication can be acquired in advance according to the pattern information, and scheduling all the transmission of each message can be avoided.

2. The method according to claim 1, wherein the pattern information comprises at least one parameter associated with the message transmission, and the parameter comprises at least one of a message delay and a message size.

3. A method of performing pattern-based message transmission in a base station serving a user equipment, the method comprising:
   receiving an equipment identifier of the user equipment from the user equipment;
   determining pattern information for the user equipment according to the equipment identifier;
   transmitting the pattern information to the user equipment; and
   performing message transmission with the user equipment based on the pattern information;
   wherein, the pattern information predefines an exchange of messages to be performed, thus the flow and content of the whole communication can be acquired in advance according to the pattern information, and scheduling all the transmission of each message can be avoided.

4. The method according to claim 3, wherein the determining further comprises: the base station pre-stores the equipment identifier and the pattern information corresponding to the equipment identifier, and determines the pattern information for the user equipment according to the equipment identifier.

5. The method according to claim 3, wherein the pattern information comprises at least one parameter associated with the message transmission, and the parameter comprises at least one of a message delay and a message size.

6. A method of performing pattern-based message transmission in a user equipment served by a base station, the method comprising:
   receiving system information from the base station via a broadcast of the base station, the system information comprising equipment identifiers of respective user equipment and corresponding pattern information; and
   selecting the corresponding pattern information from the system information according to the equipment identifier to perform message transmission with the base station based on the pattern information;
   wherein, the pattern information predefines an exchange of messages to be performed, thus the flow and content of the whole communication can be acquired in advance according to the pattern information, and scheduling all the transmission of each message can be avoided.

7. The method according to claim 6, wherein the system information further comprises service identifiers, and the selecting further comprises: selecting the corresponding pattern information from the system information according to the equipment identifier and the service identifier to perform message transmission with the base station based on the pattern information.

8. The method according to claim 6, wherein the pattern information comprises at least one parameter associated with the message transmission, and the parameter comprises at least one of a message delay and a message size.

9. A method of performing pattern-based message transmission in a base station serving a user equipment, the method comprising:
   broadcasting system information to respective user equipment, the system information comprising equipment identifiers of the respective user equipment and corresponding pattern information; and
   performing message transmission with the user equipment based on the pattern information selected by the user equipment;
   wherein, the pattern information predefines an exchange of messages to be performed, thus the flow and content of the whole communication can be acquired in advance according to the pattern information, and scheduling all the transmission of each message can be avoided.

10. The method according to claim 9, wherein the system information further comprises service identifiers so that the user equipment selects the corresponding pattern information from the system information according to the equipment identifier and the service identifier to perform message transmission with the base station based on the pattern information.

11. The method according to claim 9, wherein the pattern information comprises at least one parameter associated with the message transmission, and the parameter comprises at least one of a message delay and a message size.

12. A method of performing pattern-based message transmission in a user equipment served by a base station, the method comprising:
   transmitting pattern information to the base station;
   receiving from the base station the pattern information confirmed and/or altered by the base station; and
   performing message transmission with the base station based on the pattern information confirmed and/or altered by the base station;

wherein, the pattern information predefines an exchange of messages to be performed, thus the flow and content of the whole communication can be acquired in advance according to the pattern information, and scheduling all the transmission of each message can be avoided.

13. The method according to claim 12, wherein the pattern information comprises at least one parameter associated with the message transmission, and the parameter comprises at least one of a message delay and a message size.

14. A method of performing pattern-based message transmission in a base station serving a user equipment, the method comprising:
   receiving pattern information from the user equipment;
   confirming and/or altering the pattern information according to a practical condition;
   transmitting the confirmed and/or altered pattern information to the user equipment; and
   performing message transmission with the user equipment based on the confirmed and/or altered pattern information;
   wherein, the pattern information predefines an exchange of messages to be performed, thus the flow and content of the whole communication can be acquired in advance according to the pattern information, and scheduling all the transmission of each message can be avoided.

15. The method according to claim 14, wherein the pattern information comprises at least one parameter associated with the message transmission, and the parameter comprises at least one of a message delay and a message size; and/or the practical condition comprises at least one of current allocation of physical resources, a real protocol flow and a process delay.

* * * * *